United States Patent [19]
Coudray et al.

[11] Patent Number: 5,496,151
[45] Date of Patent: Mar. 5, 1996

[54] COOLED TURBINE BLADE

[75] Inventors: Xavier G. A. Coudray, Fontainebleau; Philippe M. P. Pichon, Yerres, both of France

[73] Assignee: Societe Nationale D'Etude et de Construction de Moteures D'Aviation "Snecma", Paris, France

[21] Appl. No.: 379,293

[22] Filed: Jan. 27, 1995

[30] Foreign Application Priority Data

Feb. 3, 1994 [FR] France .................. 94 01194

[51] Int. Cl.⁶ ............................................. F01D 5/18
[52] U.S. Cl. ............................. 416/97 R; 415/115
[58] Field of Search ................ 416/97 R, 96 R; 415/115

[56] References Cited

U.S. PATENT DOCUMENTS

| | | | |
|---|---|---|---|
| 3,619,077 | 11/1971 | Wile et al. | 416/97 R |
| 5,215,431 | 6/1993 | Derrien | 415/115 |
| 5,342,172 | 8/1994 | Coudray et al. | 416/97 R |
| 5,370,499 | 12/1994 | Lee | 416/97 R |

FOREIGN PATENT DOCUMENTS

| | | |
|---|---|---|
| 0330601 | 8/1989 | European Pat. Off. . |
| 0375175 | 6/1990 | European Pat. Off. . |
| 0562944 | 9/1993 | European Pat. Off. . |
| 2569225 | 2/1986 | France . |
| 2202907 | 10/1988 | United Kingdom . |

*Primary Examiner*—Edward K. Look
*Assistant Examiner*—James A. Larson
*Attorney, Agent, or Firm*—Oblon, Spivak, McClelland, Maier & Neustadt

[57] ABSTRACT

A hollow turbine blade having at least one first row of holes disposed in the leading edge zone of the blade so that each hole communicates with a longitudinal internal cavity of the blade which, in use, is supplied with cooling air, is also provided with at least one second row of holes in the leading edge zone, each hole of the second row intersecting at one end a respective hole of the first row and opening at its other end in the outer surface of the blade.

9 Claims, 2 Drawing Sheets

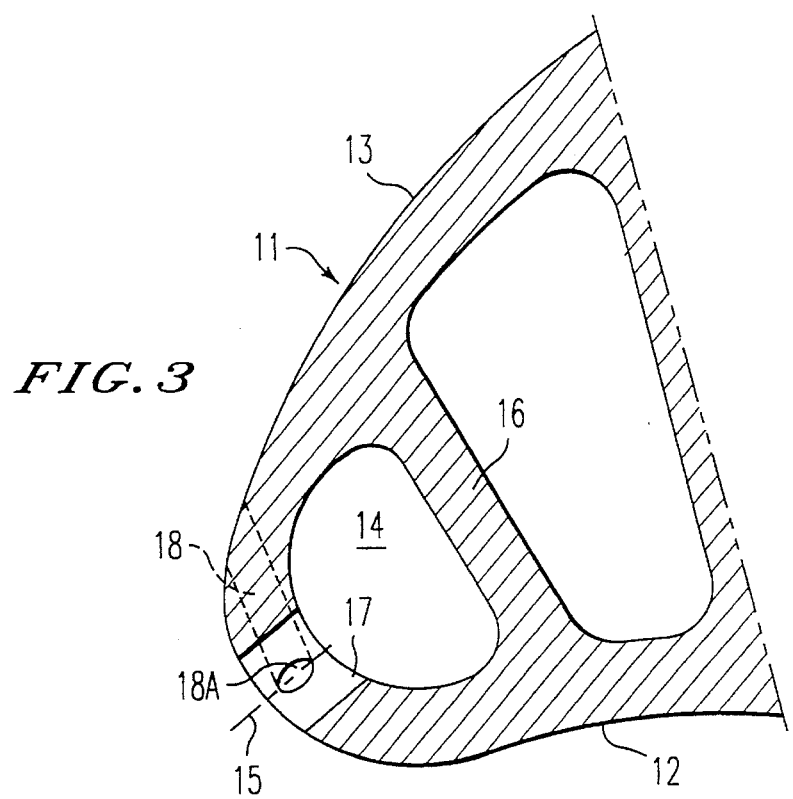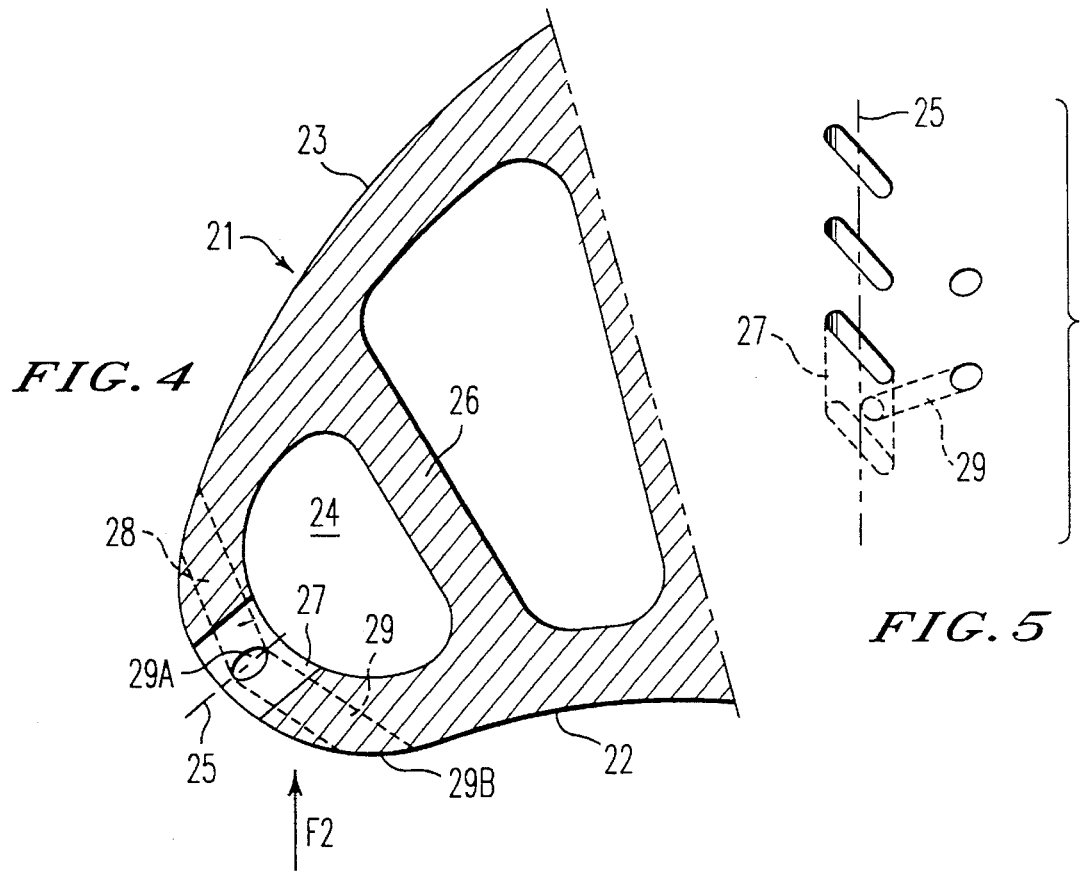

5,496,151

COOLED TURBINE BLADE

BACKGROUND OF THE INVENTION

1. Field of the Invention

The present invention relates to fixed and movable turbine blades, intended in particular for use in a turbojet engine, comprising at least one internal cavity which, in use, is swept by cooling air, and an outer wall defining a leading edge zone, an intrados face and an extrados face of the blade, the wall including rows of holes communicating with the internal cavities for the escape of cooling air.

2. Summary of the Prior Art

Blades of this type are well known, and an example is disclosed in EP-A-0562944 in which at least one row of holes communicating with a first longitudinal internal cavity of the blade is disposed in the leading edge zone of the blade on opposite sides of the center line of the leading edge, the holes being distributed over the height of the blade and arranged in an angular pattern, and each hole having an oblong section and being inclined so that its inner end is closer to the root of the blade than its outer end. In a preferred embodiment, there are two of these rows forming a first double row, and two second rows of holes, also communicating with the first cavity, arranged on opposite sides of the leading edge of the blade, one beyond each of the first rows.

In spite of such improvements, the continual increase in the temperature at the inlet of turbomachine turbines, and particularly in aircraft engines, makes it necessary to continue to seek optimum cooling of the constituent parts of the turbine with the additional aim of extending the life of the parts and optimizing the performance. The leading edge of turbine blades, whether in fixed guides or bladed turbine wheels, constitutes a particularly critical area as it is directly exposed to the whole of the gases at their highest temperature, and the creation of a film of cold cooling air at this position is hardly possible.

Accordingly, it is an object of the invention to improve the cooling of a turbine blade of the type described above, while retaining its other known characteristics necessary to ensure the required operating conditions.

SUMMARY OF THE INVENTION

To this end, the invention provides a turbine blade for use particularly in a turbojet engine, comprising an outer wall having an outer surface and defining a leading edge zone, an intrados face and an extrados face of said blade, means defining at least one longitudinal internal cavity which, in use, is swept by cooling air, and means defining a plurality of rows of holes in said outer wall for the escape of cooling air from said internal cavities, at least one first row of said rows of holes being disposed in said leading edge zone of said blade with each hole of said at least one first row communicating at one end with a first one of said longitudinal internal cavities and opening at its other end in the outer surface of said outer wall, and at least one second row of said rows of holes being provided in said leading edge zone parallel to the center line of said leading edge zone and such that each hole of said at least one second row communicates at one end with a respective one of said holes in said at least one first row at a position between the two ends of said respective first row hole and opens at its other end in said outer surface of said outer wall, whereby the holes of said first and second rows of holes intersect each other in pairs such that cooling air from said first longitudinal internal cavity flows through the holes of said at least one first row and cooling air from said holes of said at least one first row flows through the holes of said at least one second row.

In a first application of the invention to a blade for use as a fixed guide vane of a turbine, the blade preferably has two of said first rows of holes disposed on opposite sides of said center line of said leading edge zone, and two of said second rows of holes disposed on opposite sides of said two first rows, the holes of said first and second rows of holes on one side of said center line intersecting each other in pairs, and the holes of said first and second rows of holes on the other side of said center line intersecting each other in pairs.

In a second application of the invention to a blade for use on a movable turbine wheel, the blade preferably has a single first row of holes centered on the center line of the leading edge zone and, depending on the application, either a single second row of holes is provided in the leading edge zone on the extrados face side thereof, or two second rows of holes are provided on opposite sides of the first row of holes, each hole of the first row communicating with a respective one of the holes in each of the two second rows of holes.

Other preferred features and advantages of the invention will become apparent from the following description of preferred embodiments of the invention, given by way of example, with reference to the attached drawings.

BRIEF DESCRIPTION OF THE DRAWINGS

FIG. 3 is a diagrammatic transverse sectional view, similar to that of FIG. 1, of the leading edge zone of a second embodiment of the invention in the form of a cooled blade for a turbine wheel;

FIG. 4 is a diagrammatic transverse sectional view, similar to those of FIGS. 1 and 3, of the leading edge zone of a third embodiment of the invention in the form of an alternative cooled blade for a turbine wheel; and FIG. 5 is an elevational view of part of the leading edge zone of the third embodiment, looking along the arrow F2 in FIG. 4.

DESCRIPTION OF THE PREFERRED EMBODIMENTS

For a more detailed fuller description of a cooled turbine blade to which the present invention relates, reference should be made to EP-A-0562944 in the name of SNECMA, the content of which is incorporated herein by reference and which describes in detail the general characteristics and conditions of use of such a blade.

Figure 1:
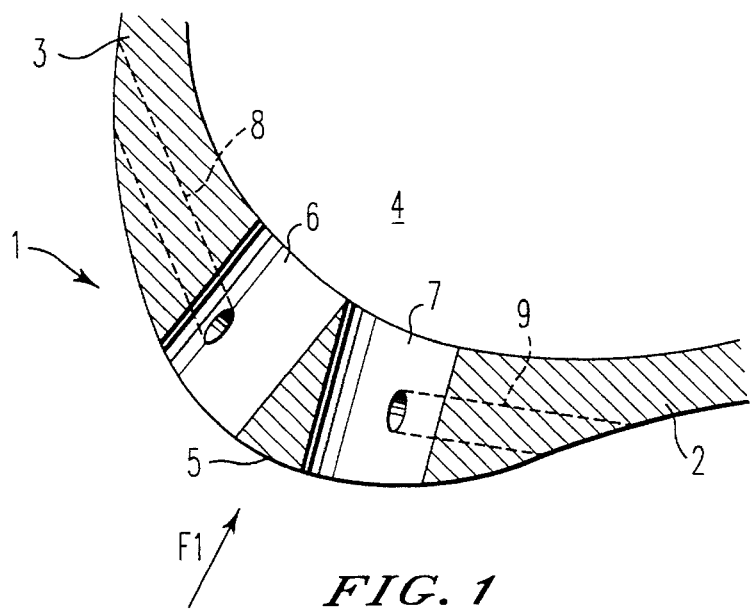
FIG. 1 is a diagrammatic transverse sectional view of the leading edge zone of a first embodiment of a turbine blade in accordance with the invention in the form of a cooled fixed guide vane, the section being taken along line I—I in FIG. 2.
Figure 2:
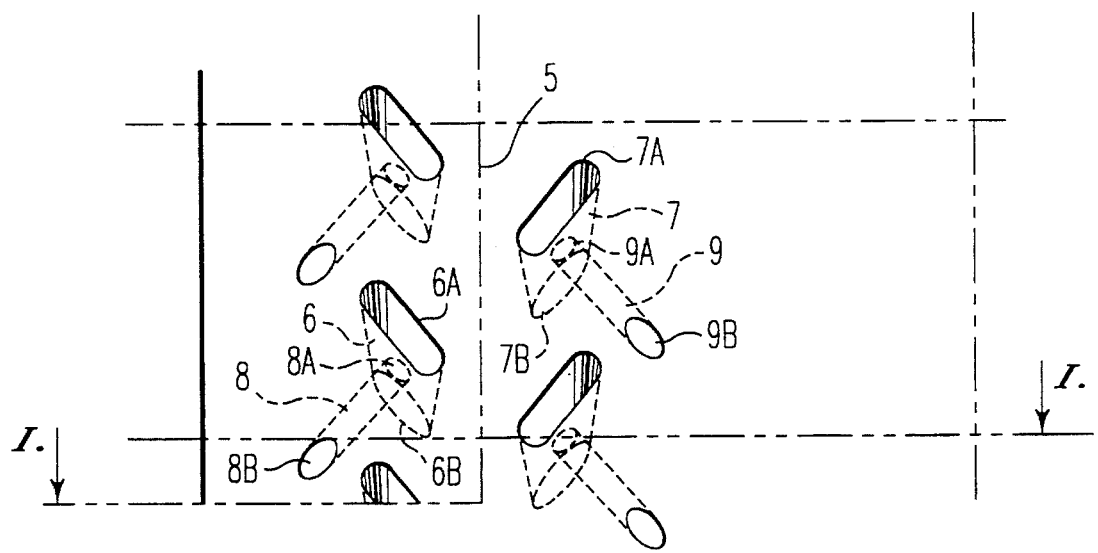
FIG. 2 is an elevational view of part of the leading edge zone of the first embodiment, looking in the direction of arrow F1 in FIG. 1.

The partial views of FIGS. 1 and 2 show a first embodiment of the application of the invention for a turbine blade 1 in the form of a fixed guide vane. Only the leading edge zone of the blade 1, forming the transition between the intrados face 2 and the extrados face 3 of the blade 1 has been shown in the drawings. As is known from EP-A-

0562944, the blade 1 is hollowed and has longitudinal internal cavities for the flow of cooling air in a manner which is known per se, the supply of air being provided at one of the ends of the blade. A first longitudinal internal cavity 4 is thus provided behind the leading edge of the blade 1. Reference 5 denotes the theoretical geometric line of the leading edge of the blade 1, i.e. its center line, where the gas stream reaching the blade separates to flow, on the one hand, along the intrados face 2 of the blade 1 and, on the other hand, the extrados face 3 of the blade 1.

As is known from EP-A-0562944, two first rows of slots or holes 6 and 7 through the outer wall of the blade are provided in the leading edge zone on opposite sides of the center line 5, the holes of each row being evenly spaced over the height of the blade. As may be seen in FIG. 2, each first row of holes 6 and 7 extends substantially parallel to the center line 5, and in the example shown each hole 6, 7 has an oblong-shaped section. Furthermore, each hole 6, 7 has a double orientation. Firstly, as seen facing the leading edge, the major axes of the sections of the holes 6 and 7 on opposite sides of the centre line 5 define a V-shaped arrangement, and the outer ends 6A and 7A of the holes 6 and 7 thus form an angular pattern. Secondly, relative to the height of the blade, the inner end 6B, 7B of each hole is situated at a level below that of the outer end 6A, 7A respectively. In addition, in this embodiment the cross-section of each hole 6, 7 increases progressively from the inner end 6B, 7B to the outer end 6A, 7A.

In accordance with the invention, this known construction is provided with two second rows of holes 8 and 9 within the thickness of the leading edge of the blade 1 on opposite sides of the two first rows of holes 6 and 7. Each hole 8 intersects a respective hole 6 at the inner end 8A of the hole 8 and opens at its outer end 8B to the outer surface of the blade 1 on the extrados side. Similarly, each hole 9 intersects a respective hole 7 at the inner end 9A of the hole 9 and opens at its outer end 9B to the outer surface of the blade 1 on the intrados side.

The general cooling process of the blade 1 remains much as described in EP-A-0562944. In particular, the cooling air flowing in the first longitudinal internal cavity 4 of the blade 1 passes through the holes 6 and 7 in the leading edge of the blade and, as a result of the orientation of the jets obtained, creates a cooling air film on the outer wall of the blade. However, with the present invention, an additional effect is obtained as a result of the arrangement of the holes 8 and 9 intersecting with the holes 6 and 7. Indeed, a flow of cooling air is taken from the flow through the first rows of holes 6 and 7 to supply the holes 8 and 9 of the second rows. As a result of the slanting arrangement of the holes 8 and 9 within the thickness of the blade wall in the leading edge zone, the heat exchange area in the wall is considerably increased, resulting in an improved thermal pumping. The length of the holes 8 and 9 is greater than that of holes arranged perpendicularly to the blade wall. The slanting arrangement within the wall also enables the holes 8 and 9 to come very close to the outer surface of the blade and to be tangential to this surface over a great length, and the thermal pumping resulting therefrom is thus performed nearer to the outer wall of the blade. Furthermore, the angle of discharge of cooling air at the outer ends of the holes 8 and 9 relative to the tangent to the outer wall of the blade is low, resulting in an increase in the efficiency of the film of cooling air emitted at the outer surface of the blade 1, as well as a reduction of the aerodynamic losses induced by these emissions.

It is also noteworthy that these improvements in the cooling of the blade 1 are obtained without any appreciable increase of the flow of cooling air, which avoids impairing the aerodynamic performance and overall energy balance of the turbomachine.

Depending on the application and the results to be obtained in particular operational conditions, it is preferred to make use of certain particular arrangements. For example, the holes 8 and 9 may have a circular or oblong section and this section may be constant or, alternatively, it may increase from the inner end 8A, 9A of the hole towards the outer end 8B, 9B. Also, each hole 8 or 9 may be inclined relative to the center line 5 of the leading edge.

In all cases, the arrangements of the first rows of holes 6 and 7 and the second rows of holes 8 and 9 in the leading edge zone of the blade 1 are easy to manufacture. In particular, the holes may be obtained by drilling using an electro-erosion process or a laser, or both.

It is also envisioned that the invention will be applied to the blades of a movable turbine wheel, particularly when, having regard for the normal direction of flow of the gases in a turbomachine, the turbine wheel is located immediately after the turbine inlet guide which receives the gases issuing from the combustion chamber, and is thus subjected to very high temperatures. As a result, there is a need also to cool the blades of the movable wheel in an optimum manner and particularly the most stressed part of the blades constituted by the leading edge, so as to ensure the blades have a satisfactory working life.

One embodiment of this application to a movable blade is shown in FIG. 3, wherein a blade 11, of which only the forward part has been shown, has, in a known manner, an outer wall defining an intrados face 12 and an extrados face 13 separated by a leading edge zone having a center line 15, i.e. the theoretical geometric line of separation between the gas flows which, in use, flow over the intrados face 12 and over the extrados face 13. The blade 11 is hollow and comprises a first longitudinal internal cavity 14 provided behind the leading edge of the blade and separated from the next cavity by an internal partition 16. These cavities permit the flow of cooling air in a manner known per se, a supply of air being provided through the root of the blade. In an equally known manner, a first row of slots or holes 17 is provided through the blade wall in the leading edge zone to permit the escape of the air flowing in the first cavity 14 while ensuring cooling of the leading edge, the holes 17 being centered on the center line 15 of the leading edge and being evenly spaced along the center line.

Preferably, the holes 17 have an oblong-shaped cross-section, and are inclined to allow air to flow outwards from the bottom to the top relative to the root and the tip of the movable blade 11.

In accordance with the invention, a second row of holes 18 is provided in the leading edge zone of the blade. These holes 18 are located within the thickness of the outer wall of the blade 11, and each hole 18 intersects a respective one of the holes 17 at a first end 18A of the hole 18 and opens at its other end 18B in the outer surface of the blade 11 on the extrados side.

The operation and the advantages of the movable blade 11 are much as described above for the fixed guide blade 1 with reference to FIGS. 1 and 2, particularly the improvement of the cooling of the leading edge of the blade resulting from the intersecting holes 17 and 18.

In the alternative embodiment shown in FIGS. 4 and 5, a movable turbine blade 21, similar to the movable blade 11 shown in FIG. 3, comprises a leading edge zone having a center line 25 separating an intrados face 22 and an extrados face 23, and a first row of holes 27 centered on the line 25 and communicating with a first inner longitudinal cavity 24 bounded by a partition 26.

The movable blade 21 has a second row of holes 28 intersecting with the holes 27 of the first row and opening in the outer surface of the blade 21 on the extrados side as in the embodiment of FIG. 3. In the present embodiment, however, there is an additional second row of holes 29 provided within the thickness of the outer wall of the blade in the leading edge zone on the opposite side of the center line 25 from the row of holes 28. Each of the holes 29 also intersects a respective one of the holes 27 at a first end 29A of the hole 29 and opens at its outer end 29B in the outer surface of the blade 21 on the intrados side.

Thus, each hole 27 of the first row supplies cooling air both to a hole 28 and to a hole 29 of the two second rows. The improvement of the cooling of the leading edge of the blade achieved by the holes 28 and 29 intersecting with the holes 27, as well as the general operation and the advantages obtained, are again similar to those previously described for the other embodiments.

We claim:

1. A turbine blade for a turbojet engine, comprising:

an outer wall having an outer surface and defining a leading edge zone, an intrados face and an extrados face of said blade, at least one longitudinal internal cavity which, in use, is swept by cooling air, and a plurality of rows of holes located in said outer wall for the escape of cooling air from said internal cavity, at least one first row of said rows of holes being disposed in said leading edge zone of said blade wherein each hole of said at least one first row of holes communicates at one end with a first cavity of said at least one longitudinal internal cavity and is opened at its other end in the outer surface of said outer wall, and at least one second row of said rows of holes being provided in said leading edge zone, said at least one second row of holes being parallel to a center line of said leading edge zone such that each hole of said at least one second row communicates at one end with a respective one of said holes in said at least one first row at a position between the two ends of said respective first row hole and opens at its other end in said outer surface of said outer wall, such that the holes of said first and second rows of holes intersect each other in pairs and cooling air from said first longitudinal internal cavity flows through the holes of said at least one first row and cooling air from said holes of said at least one first row flows through the holes of said at least one second row.

2. A turbine blade according to claim 1 wherein each hole of said at least one second row of holes has a circular section.

3. A turbine blade according to claim 1 wherein each hole of said at least one second row of holes has an oblong-shaped section.

4. A turbine blade according to claim 1 wherein each hole of said at least one second row of holes has a constant section.

5. A turbine blade according to claim 1 wherein each hole of said at least one second row of holes has a section which increases from said one end thereof to said other end thereof in said outer surface of said outer wall.

6. A turbine blade according to claim 1 wherein each hole of said at least one second row of holes has its axis inclined at an angle relative to said center line of said leading edge zone of said blade.

7. A turbine blade according to claim 1, wherein said blade comprises a fixed guide vane and has two of said first rows of holes disposed on opposite sides of said center line of said leading edge zone, and two of said second rows of holes disposed on opposite sides of said two first rows, the holes of said first and second rows of holes on one side of said center line intersecting each other in pairs, and the holes of said first and second rows of holes on the other side of said center line intersecting each other in pairs.

8. A turbine blade according to claim 1, wherein said blade is located on a turbine wheel and has a single first row of holes and a single second row of holes, said first row of holes being centered on said center line of said leading edge zone.

9. A turbine blade according to claim 1, wherein said blade is located on a turbine wheel and has a single first row of holes centered on said center line of said leading edge zone, and two of said second rows of holes disposed on opposite sides of said first row, each hole of said first row of holes communicating with a respective one of said holes in each of said two second rows of holes.

* * * * *